United States Patent [19]
Keller et al.

[11] Patent Number: 5,350,828
[45] Date of Patent: Sep. 27, 1994

[54] SYNTHESIS AND POLYMERIZATION OF DITHIOETHER-LINKED PHTHALONITRILE MONOMERS

[75] Inventors: Teddy M. Keller, Alexandria, Va.; Thomas R. Price, deceased, late of Fort Washington, Md., by Carolyn R. Price, legal representative

[73] Assignee: The United States of America as represented by the Secretary of the Navy, Washington, D.C.

[21] Appl. No.: 47,332

[22] Filed: Dec. 18, 1992

Related U.S. Application Data

[62] Division of Ser. No. 599,939, Oct. 19, 1990, Pat. No. 5,202,414, which is a division of Ser. No. 274,216, Nov. 21, 1988, Pat. No. 5,004,801.

[51] Int. Cl.$^5$ .............. C08G 63/44; C08G 73/02; C08G 75/00; C08G 83/00
[52] U.S. Cl. ..................... 528/183; 528/180; 528/360; 528/362; 525/418; 525/535
[58] Field of Search ............... 528/183, 180, 360, 362; 525/535, 418

[56] References Cited

U.S. PATENT DOCUMENTS

| | | |
|---|---|---|
| 4,226,801 | 10/1980 | Keller et al. |
| 4,259,471 | 3/1981 | Keller et al. |
| 4,409,382 | 10/1983 | Keller |
| 4,587,325 | 5/1986 | Keller |
| 5,004,801 | 4/1991 | Keller et al. ............ 528/362 |
| 5,202,414 | 4/1993 | Keller et al. ............ 528/362 |

OTHER PUBLICATIONS

Teddy M. Keller, "Phthalonitrile-Based Conductive Polymer", J. Poly. Sci: Part A: Polymer Chemistry, vol. 25, 2569–2576 (Jun. 1987).

Keller et al., "High Temperature Intrinsically Conductive Polymer", Polymer Communications, vol. 28, Dec. 1987, pp. 334–336.

Primary Examiner—John Kight, III
Assistant Examiner—P. Hampton-Hightower
Attorney, Agent, or Firm—Thomas E. McDonnell; Barry A. Edelberg

[57] ABSTRACT

Dithioether-linked phthalonitrile monomer are prepared by a substitution reaction between 4-nitrophthalonitrile and a dimercaptan and are polymerized to a high-temperature, oxidation-resistant polymer by heating them at a temperature above their melting point. The rate of polymerization is increased by the addition of an amine. Electrical conductivity of the polymer can be increased to the conductor range by heating the polymer above about 400° C.

7 Claims, No Drawings

SYNTHESIS AND POLYMERIZATION OF DITHIOETHER-LINKED PHTHALONITRILE MONOMERS

This is a division of application Ser. No. 07/599,939, filed Oct. 19, 1990, U.S. Pat. No. 5,202,414 which is a division of Ser. No. 07/274,216, filed on Nov. 21, 1988, U.S. Pat. No. 5,004,801.

BACKGROUND OF THE INVENTION

This invention relates generally to the synthesis and polymerization of phthalonitrile monomers, and, more particularly to the synthesis, polymerization and pyrolization of dithioether-linked phthalonitrile monomers.

Phthalonitrile monomers have two phenyl dinitrile groups connected by a linking group. The linking group in the monomer becomes the linking group in the polymer. The properties of the polymer are determined to a large degree by the linking group. Heretofore, the linking group has been generally hydrocarbons, phenoxy, alkoxy or sulfone moieties.

Examples of previous phthalonitrile monomers and polymers demonstrate the versatility and importance of this growing class of materials. Keller, in the U.S. Pat. No. 4,234,712, used sulphone and ketone groups to link phthalocyanines, thus forming high temperature structural composites and adhesives. Similarly, Keller, in U.S. Pat. No. 4,238,601, used perfluorinated alkyl substituents on the linking and phenyl groups to increase the corrosive resistance of polymerized phthalocyanines. Polyphenylether-bridged polyphthalocyanines were prepared by Keller, U.S. Pat. No. 4,259,471, which exhibited exceptional thermal stability and oxidative resistance. Also, by varying the fluoride content of the constituent and substituent groups of the linking group, Keller, in U.S. Pat. No. 4,315,093, produced a phthalonitrile polymer with improved water repellancy and resistance to oxidative attacks. The performance of the polymers have exceeded polyoxides, epoxies and other similar polymers in many applications.

One property of high-temperature organic materials that is of great interest is electrical conductivity. Materials with high conductivities have been obtained by either chemical doping of a linear conjugated system or by thermal treatment of polymers. In the case of chemical doping, the conductivity of a polymer is varied and controlled by the amount of dopant used. For thermal treatment, the conductivity of a polymer is changed by a precise pyrolytic procedure. One polymer that has produced a highly conductive organic material through thermal treatment is, the diether-linked phthalonitrile polymer of U.S. Pat. No. 4,587,325. It has been determined that the ether linkages interrupt electronic delocalization. Hence a pyralyzed polymer without ether linkages would have a better electrical stability.

SUMMARY OF THE INVENTION

It is, therefore, an object of this invention to replace metals and inorganic semiconductors and conductors with a non-doped conductive organic polymer with substantial structural strength and thermal stability.

Another object of this invention is to prepare this conductive polymer from an easily processable, low-cost phthalonitrile monomer.

Another object of this invention is to convert this polymer into a highly conductive material by thermal means.

Yet another object of this invention is to produce a polymer with a predetermined conductivity over a wide range from insulator to semiconductor to conductor by a simple change in the polymerization temperature.

A further object of this invention is to provide a conductive polymer which is environmentally stable.

A still further object of this invention is to provide a conductive polymer for use at elevated temperatures in an oxidizing environment.

These and other objects of the invention are achieved by polymerizing dithioether-linked phthalonitrile monomers with a thermally stable amine curing agent at a temperature between the melting point of the monomers and thermal decomposition point for the polymers.

DETAILED DESCRIPTION OF THE INVENTION

The phthalonitrile monomers of the present invention has the formula:

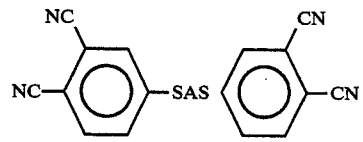

wherein A is a linear or branched, saturated or unsaturated aliphatic hydrocarbon having from 2 to 30 carbon atoms, the preferred being a linear, saturated hydrocarbon having 5 to 15 carbon atoms, an aromatic or saturated, single or multiple ring cyclic hydrocarbon having from 4 to 30 carbon atoms, the preferred being multiple aromatic rings, especially biphenyl; or a fused ring hydrocarbon, preferable a fused ring structure containing only aromatic units, particularly naphthalene or anthracene. The criteria for the linking group, (—S—A—S—) is that the moiety has at least two thio-based linkages, thermally stable at the polymerization temperatures of the monomer. Furthermore, the linking group cannot contain a functional group that is reactive with the nitrile group of the 4-nitrophthalonitrile. The preparation of the phthalonitrile can be summarized by the following reaction:

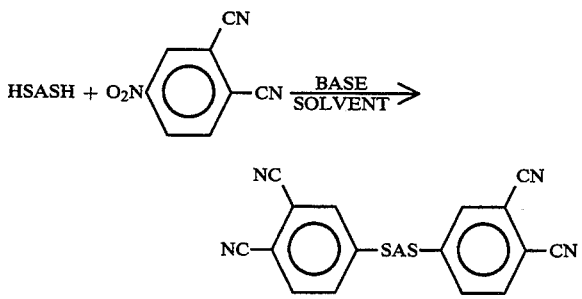

The preparation comprises mixing 4-nitrophthalonitrile with a dithiol and a base in a dipolar aprotic solvent.

The dithiol and 4-nitrophthalonitrile are preferably mixed in a approximate stoichiometric amount, i.e., a dithiolnitrophthalonitrile mole ratio of 1:2. The solvent is added in an amount at least sufficient to dissolve the reactants. The preferred solvents are dimethyl sulfoxide (DMSO), N,N-dimethylformamide (DMF),N-methyl pyrrolidine (NMP) and N,N-dimethyl acetamide with DMSO being the most preferred.

The base removes a hydrogen from the thio group. At least a stoichiometric amount of the base is added and preferably a 10 to 25 mole percent excess is added. It is noted that excess base can be trapped in the product; so, extra care in the workup and purification should be used whenever an excess of base is used. The preferred bases are lithium, sodium, potassium, or calcium hydroxide; sodium, potassium or calcium carbonate; organolithium reagents such as methyl or n-butyl lithium Grignard agents and sodium or potassium bicarbonate. The most preferred bases are sodium or potassium hydroxide and potassium carbonate.

If a hydroxide-type base is used, water is formed by the reaction of the base with the protic proton of the thio group. Since the cyano groups react with hydroxide in the presence of water, it is necessary to remove all water from the reaction mixture before adding the nitrophthalonitrile reactant. For this reason, the method utilizing a water-producing base requires the initial steps of mixing the solvent, base, dithiol and a refluxing liquid, e.g., benzene or toluene until all water (as determined by the stoichiometric equation) has been removed by azeotropic distillation. The solution is then cooled to about room temperature before adding the nitrophthalonitrile. After the nitrophthalonitrile has been added, the reaction solution is slowly heated to a temperature from about 20° V to about 100° C. and preferably from 25° C. to 80° C. and heating is maintained until the reaction is completed, as determined by e.g., monitoring the disappearance of the $NO_2$ absorption at 1539 and 1358 $cm^{-1}$ in the IR spectrum. Next, the reaction solution is cooled to about room temperature and poured into cold water (about 10° C. or less). The product is collected by, e.g., suction filtration, washed with water, and dried in an oven at reduced pressure.

If the base does not produce water, such as, a carbonate or bicarbonate, the reaction can be performed in one step. The reactants, base, and solvent are added to a reaction vessel in one step. The reaction mixture is then heated to a temperature from about 20° C. to about 100° C. and preferably from 25° C. to 80° C. Upon completion the reaction mixture is slowly poured into cold dilute hydrochloric acid (2N or less) at a temperature below 15° C. The product yield can be increased if the carbonate or bicarbonate is added in increments with no increment being larger than one-third of the total base. When the base is added in one portion, the reaction may not proceed to completion, which is probably attributed to the surface of the base becoming coated during the course of the reaction.

The monomer synthesis is done in an inert atmosphere and preferably in a nonoxidizing atmosphere. The most preferred atmospheres are argon, helium and nitrogen.

Polymerization of the subject monomers is believed to afford a complex structural mixture similar in kind to other phthalonitrile polymers. To date physical analysis have not been able to determine the actual structure of the polymer.

The polymer can be synthesized neat, or in the presence of powdered metals, metallic salts or amine curing agents. Neat polymerization is extremely difficult and slow due to the absence of active hydrogen atoms. The addition of powdered metals or metallic salts improves the reaction time but also presents other problems, e.g. voids in the polymer. The cure time and polymerization temperature are reduced significantly in the presence of an amine curing agent.

The amine curing agent, when present in minute quantities, probably attacks the nitrile groups of the dinitrile reactant, precipitating the formation of N-substituted-3 iminoisoindoline intermediates. These units can propagate the polymerization reaction by reacting with other nitrile groups. As the propagating reaction progresses, other reaction pathways involving polytriazine and polyphthalocyanine formations may also be present.

The amine curing agents used to polymerize the subject monomers can be any monoamine or polyamine (containing more than one amine unit) that does not volatilize too quickly or decompose at the polymerization temperatures. The preferred amine curing agents are diamines. Examples of amine curing agents are m- and p-phenylenediamine, 4-aminophenylether, 3-aminophenyl sulfone, 4-aminophenyl sulfone, 4,4'-(p-phenylenedioxy)dianiline and 4,4'methylenedianiline, and a polyamine represented by the formula:

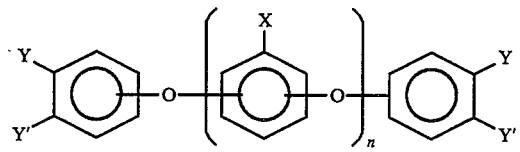

wherein n is 0, 1, 2, 3, 4, or 5; X is a hydrogen, a halogen, a halocarbon, an alkyl, an amino group or a amino group substituted with alkyls; Y is a hydrogen or an amino group; Y' is a hydrogen or a amino group and at least one Y or Y' must be an amino group. The most preferred amine curing agent is the above polyamine wherein n is 1, 2, or 3; X is a hydrogen, chlorine, bromine, an alkyl of five carbons or less an amino group or an amino group substituted with an alkyl of five carbons or less; Y is an amino group and Y' is a hydrogen. The most preferred amine curing agent is 1, 3-bis (3-aminophenoxy)benzene. These polyamine curing agents are disclosed and claimed in the U.S. patent application by Teddy M. Keller entitled "Curing Agent for High-Performance Phthalonitrile Resin" and filed on Nov. 17, 1988 which is incorporated herein by reference. Aliphatic amines can be used but they reduce the thermal and oxidative stability of the polymers. The amount of the curing agent is from about 0.5 to weight percent the stoichiometric amount of the amine agent about 10 percent of the monomer weight, preferrably from 1 to 2 weight precent.

Polymerization proceeds above the melting point of the monomer. It is preferred that the monomer and the amine are heated slightly above the monomers melting point until the monomer is converted to the amorphous state. The temperature is preferably from about 10° to 80° C. above the melting point and preferably from 10° to 25° C. above the melting point. After the monomer has reached the glassy state, the glass transition temperature (Tg) is greatly depressed relative to the crystalline state. Accordingly, the processing temperature to complete the polymerization can be lowered, resulting in the ability to control the polymerization reaction. After gelation, the polymer is preferably heated at temperature from 260° C. to 315° C. to enhanced the physical properties. The polymerization can be stopped after the polymer has reached the B-stage. At the B-stage, the polymer is a frangible solid which can be easily pulverized. This capability permits great versatility in the fabrication of finished products during the curing and postcuring procedures. Thermal stresses are best avoided by slowly heating and cooling the monomer and polymer. Heating can proceed rapidly up to about the melting point of the monomer. After the polymerization is completed, the polymer is preferably cooled from 0.2 to 1° C./min and most preferably from 0.3 to 0.6° C./min. The polymerization reaction carried out up to 315° C. can be performed in air. When postcured at temperatures in excess of 315° C., the polymer is heated in an inert atmosphere. The most preferred postcured atmospheres are argon, helium and nitrogen.

In summary, polymerization can proceed at a temperature from the monomer melting point to its decomposition temperature. It is possible to lower the temperature after the monomer has become amorphous and proceed with the polymerization reaction at a much lower temperature relative to the monomer melting point. The polymerization can be conveniently stopped at the B-stage and be rendered into a powder or be stored indefinitely at room temperature. Doped polymers are not preferred. It is a significant advantage of the present invention that electrical conductivity over a wide range can be achieved without doping. However, the present polymers can be doped with, for example, a salt or a metal. Depending on the amount of the salt or powdered metal being added, all or some of the salt or metal may comply with segments of the resulting polymers. The complying mechanism is evidenced by the increase in the polymerization rate. Whether the salt or metal actually becomes part of the polymer, the additive does reduce the oxidative and thermal stability. The preferred salt in that regard is stannous chloride dihydrate ($SnCl_2.2H_2O$). Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof.

Metals can also enhance the reaction rate, the preferred metals are copper, iron zinc, and nickel due to their availability, handling, and desired reactivity, as well as the enhanced thermal stability of the resulting polymer. Examples of other metals which may be used are chromium, molybdenum, vanadium, beryllium, silver, mercury, tin, lead, preferred metals are copper, iron zinc, and nickel due to their availability, handling, and desired reactivity, as well as the enhanced thermal stability of the resulting polymer. Examples of other metals which may be used are chromium, molybdenum, vanadium, beryllium, silver, mercury, tin, lead, antimony, calcium, barium, manganese, cobalt, palladium, and platinum. Additional examples of metals and salts are found in Mosher, Frank H. and Thomas, Arthur L., "Phthalocyanine Compounds", N. Y. Reinhold, 1963, p 104–141.

The amine curing agent can be added in amounts up to about the stoichiometric amount. Preferably, the amount of the amine is from 1 to 2 weight percent. The preferred amines are aromatic armines because of their superior thermal stability. The most preferred amines are the ones disclosed and claimed in the previously cited co-pending patent application.

Without a postcure, the polymer exhibits low electrical conductive properties. As the polymer is postcured at a temperature from about 300° to 600° C. and preferably from 300° C. to 500° C., polymerization continues, resulting in an unordered amorphous system. Electrical conductivity increases and is due to a variable range electron-hopping mechanism. The non-planarity of the polymer at this point does not permit the overlap of the p-orbitals within the polymers backbone, which is essential for a polymer material to exhibit conductive properties. If the polymer is held at a temperature above about 400° C., the polymer begins to lose wieght, indicating that the polymer is beginning to pyrolyze.

During pyrolysis the temperature is raised above 400° C. but preferable below 2000° C. and most preferably from 500° C. and 1000° C., the polymer gradually loses weight in a linear fashion and a black carbonaceous residue is produced. The atmosphere is inert and preferably argon, nitrogen or helium. This is in contrast to other reported pyrolyric systems, which lose most of their weight between 300° C. and 600° C. In the early stages of pyrolysis (300°–500° C.), some homolytic fission of bonds probably occurs in the polymer accompanied by the loss of low molecular weight fragments and limited polycondensation of the aromatic rings. As the pyrolyric temperature is increased, a continuous network of polyconjugated fused rings can develop within the amorphous carbon matrix from carbonization between the ring systems. Moreover, as the polycondensed ring structure increases in size, the overall resonance energy of the system is reduced from enhanced p-orbital delocalization and sufficient p-orbital overlap will be developed resulting in the appearance of electrical conduction in the pyrolyzed polymer.

The preferred pyrolysis proceeds in the following manner. The polymer is heated to a temperature from about 25° C. to about 300° C. at a rate up to about 20° C./min. After about 300° C. the temperature is increased at a rate preferably from about 0.2° C./min to about 1° C./min and most preferably from 0.3° C./min to 0.6° C./min, in an inert atmosphere, and preferably in argon, helium or nitrogen. The preferred cooling rate is from 0.2° to 1° C. /min and most preferred is from 0.3° to 0.6° C./min. The controlled heating and cooling rates minimize heat stresses in the pyrolyzed polymer. The pyrolytic temperature is maintained until the desired conductivity is obtained.

The invention having been generallly described, the following examples of the preparation and polymerization of 4,4'-bis(3,4-dicyanothiophenoxy)biphenyl and the conversion into a highly conductive organic polymer are given as particular embodiments of the invention and to demonstrate the practice and advantages thereof. It is understood that the examples are given by way of illustrations and are not intended to limit the specification or the claims to follow in any manner.

EXAMPLE 1

Synthesis of 4,4'-Bis(3,4-Dicyanothiophenoxy) Biphenyl

A mixture containing 4,4'-biphenyldithiol (4.29 g, 19.7 mmol), 4-nitrophtholonitrile (6.81 g, 39.4 mmol), and anhydrous powdered potassium carbonate (8.15 g, 59.1 mmol) in 40 ml of dry dimethyl sulphoxide was stirred for 5 hours at 50° C. under a nitrogen atmosphere. After cooling, the reaction mixture was slowly poured into 250 ml of dilute hydrochloric acid. The precipitate was isolated by suction filtration, washed with water until the washings were clear and neutral, dried and then washed with hot absolute ethanol to yield 8.78 g (95%) of the desired product, m.p. 262°–264° C.

EXAMPLE 2

Polymerization of 4,4'-Bis(3,4 Dicyanothiophenoxy) Biphenyl with Methylenedianiline.

4,4'-Bis(3,4-dicyanothiophenoxy)biphenyl was melted and degassed at reduced pressure over a period of 2 hours. To the dark melt at 260° C. was added 4,4'-methylenedianiline (MDA, 1% by weight). The resulting mixture was cured by heating at 260° C. for 8 hours, at 280° C. for 4 hours, and at 300° C. for 24 hours. Polymeric samples prepared in this manner were characterized and pyrolyzed under an inert atmosphere at elevated temperatures.

EXAMPLE 3

Polymerization of 4,4'-Bis(3,4-Dicyanothiophenoxy)Biphenyl with 1,3-Bis(3-aminophenoxy) benzene 4,4'-Bis (3,4-dicyanothiophenoxy) biphenyl was melted and degassed at reduced pressure over a period of 4 hours. To the dark melt at 260° C. was added 1,3-bis(3-aminophenoxy)benzene (APB, 2% by weight) with stirring. The resulting mixture was cured by heating at 260° C. for 8 hours, at 280° C. for 4 hours, and at 300° C. for 24 hours. Polymeric samples prepared in this manner were characterized and pyrolyzed under an inert atmosphere at elevated temperatures.

EXAMPLE 4

Pyrolysis of 4,4'-Bis(3,4-Dicyanothiophenoxy)Biphenyl-MDA Cured Polymer at 500° C.

The polymer (1.5 g) cured by using 1% by weight of MDA was heated under a oxygen-free argon atmosphere to 500° C. at a rate of 0.4° C. /min. The polymer was annealed at 500° C. for 24 hours and then cooled back to room temperature at 0.4° C./min. The polymer lost 13.7% weight during the heat treatment. The resulting pyrolysate exhibited a room temperature conductivity of $1.0 \times 10^{-10}$ S/cm.

EXAMPLE 5

Pyrolysis of 4,4'-Bis(3,4-dicyanothiophenoxy)Biphenyl-APB Cured Polymer at 600° C.

The polymer cured by using 2% by weight of APB was heated under an oxygen-free argon atmosphere to 600° C. at a rate of 0.4° C./min. The polymer was then annealed at 600° C. for 24 hours followed by cooling back to room temperature at 0.4° C./min. The polymeric composition lost 10.9% weight during the heat treatment. The resulting pyrolysate displayed a room temperature conductivity of $8.3 \times 10^{-4}$ S/cm.

EXAMPLE 6

Pyrolysis of 4,4'-Bis(3,4-Dicyanothiophenoxy)Biphenyl-APB Cured Polymer at 500° C.

The polymer, cured by using 2% by weight of APB, was heated under an oxygen-free argon atmosphere to 500° C. at a rate of 0.4° C./min. The polymer was then annealed at 600° C. for 24 hours, followed by cooling back to room temperature at 0.4° C./min. The polymeric composition lost 7.3% weight during the heat treatment. The resulting pyrolysate showed a room temperature conductivity of $6.5 \times 10^{-9}$ S/cm.

EXAMPLE 7

Pyrolysis of 4,4'-Bis(3,4-dicyanotrhiophenoxy)Biphenyl-MDA Cured Polymer at 700° C.

The polymer, cured by using 1% by weight of MDA, was heated under an oxygen-free argon atmosphere to 700° C. at a rate of 0.4° C./min. The polymer was then annealed at 700° C. for 24 hours, followed by cooling back to room temperature at 0.4° C./min. The polymeric composition lost 20% weight during the heat treatment. The resulting pyrolysate exhibited a room temperature conductivity of 8.4 S/cm.

EXAMPLE 8

Pyrolysis of 4,4'-Bis(3,4-Dicyanothiophenoxy)Biphenyl-MDA Cured Polymer at 900° C.

The polymer, cured by using 1% by weight of MDA, was heated under an oxygen-free argon atmosphere to 900° C. at a rate of 0.4° C./min. The polymer was annealed at 900° C. for 24 hours and then cooled back to room temperature at 0.4° C./min. The polymeric composition lost 27.3% weight during the heat treatment. The resulting pyrolysate showed a room temperature conductivity of $6.1 \times 10^{+1}$ s/cm.

The polymers of the present invention can be processed to a definite shaped component or film and pyrolyzed to a black conductive material. The maximum electrical conductivity is in the ranges approaching metals and is achieved in a controlled and reproduceable manner in the absence of an external chemical dopant. The pyrolysed polymer exhibited excellant thermal properties in air. The electrical conductivity is extremely stable in air.

An important aspect of the present invention is that the electrical behavior of the pyrolysed polymer can be systematically changed from an insulator to a semiconductor and made to approach metallic regions by controlling the thermal treatment process. For pyrolysis temperatures up to 700° C., the conductive behavior rapidly changed from an insulator to a semiconductor. Between 700° C. and 900° C., a less dramatic increase in conductivity is observed with increasing pyrolytic temperatures. For example, when annealed at 600°, 700° and 900° C. for 24 h, the pyrolyzed polymer exhibits a conductivity of $8.3 \times 10^{-4}$, 8.4 and 61S cm$^{-1}$, respectively. The conductivity increase appears to confirm the stepwise thermal decomposition discussed previously and the formation of planar polycondensed rings at elevated temperatures. An enhancement in the size of the conductive fused ring components allows current to flow longer distances in the individual conductive species. At the same time, the transport of current by interparticle contact (tunnelling or hopping) is reduced due to a reduction in the number of fused rings and the emergence of larger polycondensed ring systems.

Additional information and discussion on the subject monomers and polymers is available in Keller, Teddy M. and Gratz, Roy F. *High Temperature Intrinsically Conductive Polymer* in Polymer Communication, vol. 28, pp. 334 to 336 (Dec. '87).

Obviously many modifications and variations of the present invention are possible in light of the above teachings. It is therefore to be understood that within the scope of the appended claims the invention may be practiced otherwise than as specifically described.

What is claimed is:

1. A polymer produced by polymerizing a phthalonitrile monomer represented by the formula:

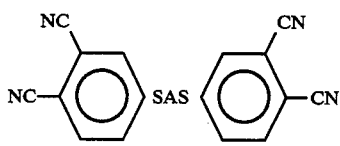

wherein A is selected from the group consisting of an aliphatic hydrocarbon having from 2 to 30 carbon atoms, a cyclic hydrocarbon having from 4 to 30 carbon atoms, and mixtures thereof in the presence of an amine to form an amine-cured polymer.

2. The polymer of the monomer of claim 1 cured with an amine.

3. The polymer of the monomer of claim 1 cured with an aromatic diamine.

4. The polymer of the monomer of claim 1 cured with an aromatic diamine.

5. The polymer of the monomer of claim 1 cured with a polyamine of the formula:

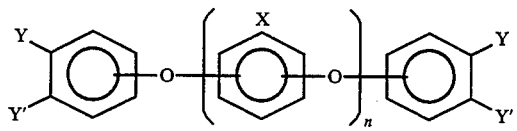

wherein n is 0, 1, 2, 3, 4 or 5; X is a hydrogen, a halogen, a halocarbon, an alkyl, an amino group or a amino group substituted with alkyls; Y is a hydrogen or an amino group Y' is a hydrogen or an amino group and at least one Y or Y' must be an amino group.

6. The polymer of the monomer of claim 1 cured with polyamine of the formula:

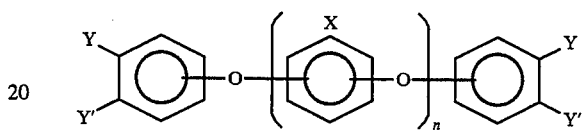

wherein n is 0, 1, 2, 3, 4 or 5; X is a hydrogen, a halogen, a halocarbon, an alkyl, an amino group or a amino group substituted with alkyls; Y is a hydrogen or an amino group; Y' is a hydrogen or an amino group and at least one Y or Y' must be an amino group.

7. The polymer of the monomer of claim 1 cured with a polyamine of the formula:

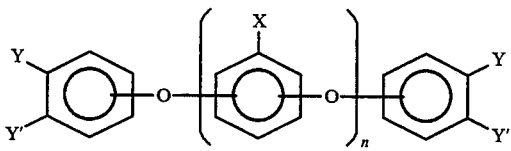

wherein n is 0, 1, 2, 3, 4 or 5; X is a hydrogen, a halogen, a halocarbon, an alkyl, an amino group or a amino group substituted with alkyls; Y is a hydrogen or an amino group; Y' is a hydrogen or an amino group and at least one Y or Y' must be an amino group.

* * * * *